Sept. 14, 1926. 1,599,838
W. A. RICE
SUPPLEMENTAL SHIELD FOR AUTOMOBILE WINDSHIELDS
Filed March 9, 1925
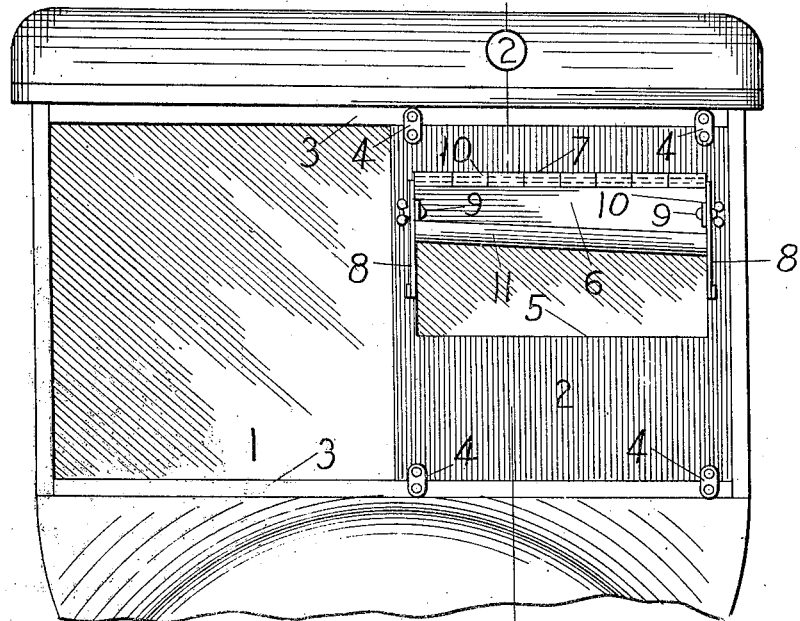
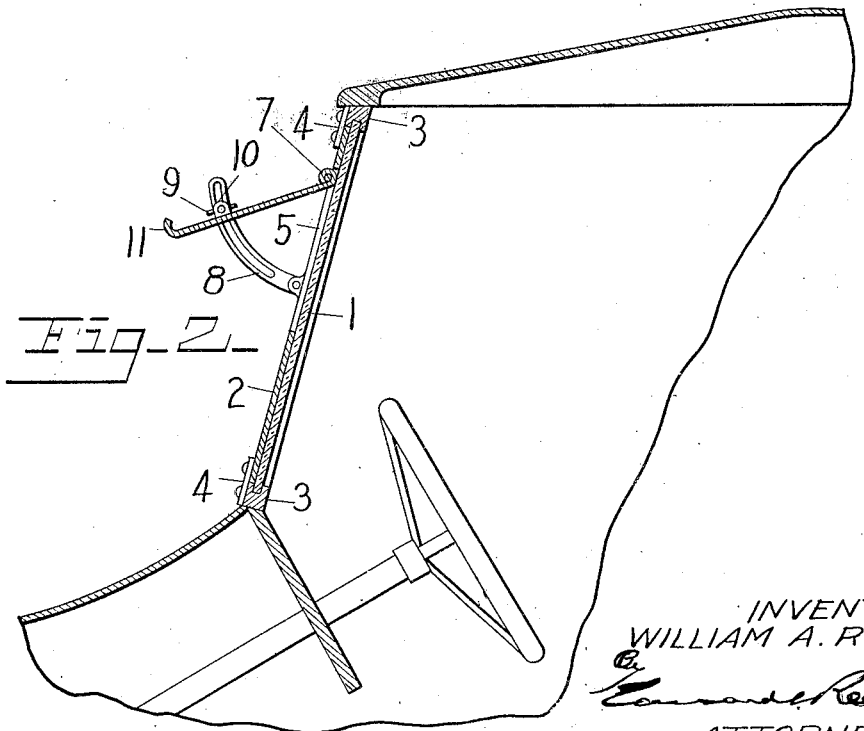
INVENTOR.
WILLIAM A. RICE.
ATTORNEY.

Patented Sept. 14, 1926.

1,599,838

UNITED STATES PATENT OFFICE.

WILLIAM A. RICE, OF MARION, OHIO.

SUPPLEMENTAL SHIELD FOR AUTOMOBILE WINDSHIELDS.

Application filed March 9, 1925. Serial No. 14,075.

This invention relates to a supplemental shield for automobile windshields.

One object of the invention is to provide a windshield with means which will effectively protect the driver against the glare of the headlights of an approaching automobile.

A further object of the invention is to provide such a device which will be simple in its construction and which can be readily applied to a windshield.

Other objects of the invention will appear as the device is described in detail.

In the accompanying drawings Fig. 1 is a front elevation of a windshield showing my invention applied thereto; and Fig. 2 is a vertical sectional view taken on the line 2—2 of Fig. 1.

In these drawings I have illustrated one embodiment of my invention and have shown the same as applied to a windshield of ordinary construction. It will be understood, however, that this particular embodiment has been chosen for the purposes of illustration only, that the supplemental shield or guard may take various forms and may be applied to windshields of various kinds or may be built into the windshield as a part thereof.

In applying my supplemental shield or guard to a windshield I provide the glass 1 of the windshield with a cover 2 of non-transparent or opaque material which is of such size and so arranged as to cover a substantial portion of the windshield directly in front of the driver. The cover may be of any suitable material and where an opaque material, as distinguished from a translucent material, is to be used I prefer to use thin sheet metal of a vertical length equal to the height of the glass in the windshield and of such a width as to cover the desired portion of the windshield glass. In the present instance, the covering extends over approximately one-half of the windshield glass. This cover sheet is placed directly against the front side of the windshield glass and is secured to the top and bottom cross bars or rails 3 by means of suitable fastening devices or clips, as shown at 4.

The covering 2 is provided with an opening 5 arranged directly in front of the driver and in his line of vision. Adjustably mounted above the opening 5 is a visor 6 which preferably extends downwardly from a point near the upper edge of the opening 5. This visor may be of the same material as the cover plate and when it is made of metal it may be hinged directly to the cover plate at the upper edge of the opening, as shown at 7. Any suitable means may be provided for supporting the visor in adjusted positions. In the present instance, I have pivotally mounted on the cover plate, on opposite sides of the opening 5, slotted arms 8 through the slots of which extend clamping bolts 9 which are mounted in lugs 10 on the visor, whereby the lower edge of the visor may be adjusted vertically with relation to the opening 5. Preferably the lower edge of the visor is turned upwardly to form a trough 11 which is inclined toward the outer side of the windshield so that any water on the visor will run off at the side of the opening 5.

The visor 6 is so adjusted that the lower edge will lie just above the normal line of vision of the driver so that he will have a clear and unobstructed view of the road beneath the visor. When it is desired to avoid the glare of approaching headlights the driver may raise his head slightly so that the lower edge of the visor will extend into his line of vision and between him and the approaching headlights, thus cutting off the glare of the lights but allowing the driver a clear view of the road immediately in front of his automobile. The opaque or non-transparent covering for the windshield glass prevents the light from approaching headlights from striking this glass and being refracted into the eyes of the driver. The visor 6 also serves as a guard to protect the glass in the rear of the opening from rain and snow and the driver always has a clear and unobstructed view of the road.

While I have shown and described one embodiment of my invention I do not desire to be limited to the details thereof as various modifications may occur to a person skilled in the art.

Having now fully described my invention, what I claim as new and desire to secure by Letters Patent, is:

1. In combination with a windshield for an automobile, a covering of non-transparent material for that portion of the windshield in front of the driver, said covering having an opening in the line of the driver's vision, a visor of non-transparent material supported near the upper edge of said opening, and means for adjusting the lower edge of said visor with relation to said opening.

2. In combination with a windshield for an automobile, a covering of non-transparent material for that portion of the windshield in front of the driver, said covering having an opening in the line of the driver's vision, a visor of non-transparent material having its upper edge pivotally mounted adjacent to the upper edge of said opening, and means for supporting the lower edge of said visor in adjusted positions with relation to said opening.

3. In combination with a windshield for an automobile, a sheet of non-transparent material mounted against the front of the windshield glass and extending from the top to the bottom of said glass and extending across that portion of the windshield glass which is directly in front of the driver, said sheet of material having an opening therein in the line of the driver's vision, a guard pivotally mounted at the upper edge of said opening, and means for supporting said guard in adjusted positions with relation to said opening.

4. In combination with a windshield for an automobile, a sheet of metal secured to said windshield in front of the glass thereof and covering that portion of said glass which is directly in front of the driver, said sheet of metal having an opening therethrough in the line of the driver's vision, a guard plate hinged at its upper edge to said sheet of metal near the upper edge of said opening, and means for adjustably supporting the lower portion of said guard.

5. In combination with a windshield for an automobile, a sheet of metal secured to said windshield in front of the glass thereof and covering that portion of said glass which is directly in front of the driver, said sheet of metal having an opening therethrough in the line of the driver's vision, a guard plate hinged at its upper edge to said sheet of metal near the upper edge of said opening, slotted arms mounted on said sheet of metal at the respective ends of said opening, and clamping bolts carried by said guard at the respective edges thereof and extending through the slots of the respective arms, whereby said guard may be secured in adjusted positions.

In testimony whereof, I affix my signature hereto.

WILLIAM A. RICE